H. O. BAKER.
ENGINE RELEASING DEVICE.
APPLICATION FILED JAN. 22, 1919.

1,332,535.

Patented Mar. 2, 1920.

WITNESS:

INVENTOR.
Hartley O. Baker
BY
ATTORNEYS.

UNITED STATES PATENT OFFICE.

HARTLEY O. BAKER, OF PUEBLO, COLORADO, ASSIGNOR TO THE BAKER STEAM MOTOR CAR AND MANUFACTURING CO., INC., OF PUEBLO, COLORADO.

ENGINE-RELEASING DEVICE.

1,332,535.    Specification of Letters Patent.    Patented Mar. 2, 1920.

Application filed January 22, 1919. Serial No. 272,492.

*To all whom it may concern:*

Be it known that I, HARTLEY O. BAKER, a citizen of the United States, residing at Pueblo, in the county of Pueblo and State of Colorado, have invented certain new and useful Improvements in Engine-Releasing Devices; and I do hereby declare the following to be a full, clear, and exact description of the invention, such as will enable others skilled in the art to which it appertains to make and use the same.

The present invention relates to a clutch or engine releasing device used or built on a differential gearing, such as used in motor vehicles, especially steam automobiles, and it is the object of the invention to provide novel and improved, yet simple, practical and efficient means embodied in a differential gearing and operable for quickly and conveniently connecting the engine to and disconnecting it from the driving wheels and gearing, thus permitting the engine to be freed or released at will.

A further object is the provision of such a device which can be readily embodied in prevailing differential gearing, with the substitution of but a few parts.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1:
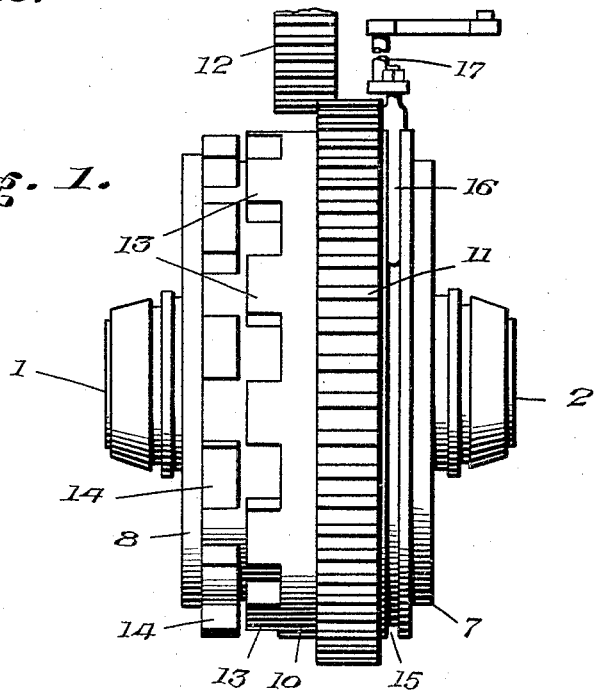
Figure 1 is a side elevation of a differential gearing embodying the improvements.
Figure 2:
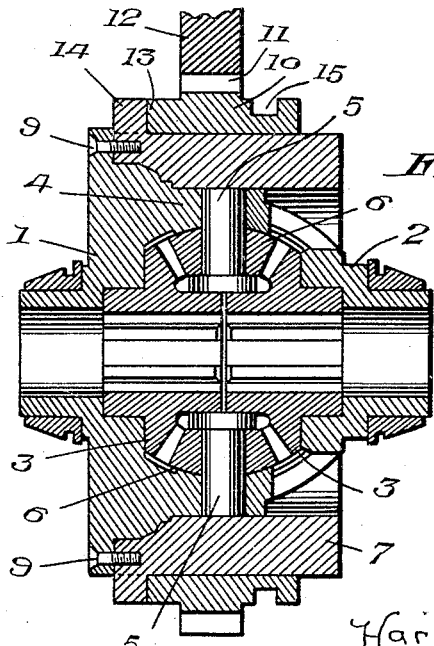
Fig. 2 is a diametrical section thereof.

The differential gearing illustrated is of well known construction, and comprises a rotatable planetary gear member 1, and an opposite member 2, with beveled differential gears 3 opposite to one another journaled in the members 1 and 2 for driving the two sections of the axle as usual. The member 1, which constitutes the driving member of the differential gearing, is of larger diameter than the member 2 and is provided with an annular flange 4 projecting toward the member 2, and carrying inwardly projecting pintles 5 on which planetary beveled pinions or gears 6 are rotatable to mesh with the gears 3 and thus provide the differential action, it being understood that when the member 1 is rotated, this carries the gears 6 around with it, and they will drive either of the gears 3 or both of them according to the direction of travel. The member 1 is usually provided with exterior gear teeth whereby it is driven from the engine, but these teeth are omitted or removed in using the present improvements.

In carrying out the invention, a sleeve 7 is fitted on the flange 4 and member 1, and one end thereof abuts an outstanding flange 8 with which the member 1 is provided, and the sleeve 7 is made fast to the member 1, such as by means of screws 9 extending through the flange 8 and taking into the corresponding end of the sleeve. This sleeve constitutes a support and guide for the gear ring or band 10 that is slidable and rotatable on the sleeve, and the ring 10 is provided between its edges with an annular series of gear teeth 11, thus providing an annular gear mounted on the differential construction with which the driving gear 12 meshes, it being understood that the gear 12 can mesh with the gear teeth 7 at any point around the differential mechanism, according to the conditions.

The ring 10 constitutes part of the clutch, and for this purpose one end of the ring 10 is notched or toothed as at 13, to provide a clutch portion coöperable and interengageable with an annular row of outstanding lugs or teeth 14 with which the sleeve 7 is provided, preferably at that end which is secured to the member 1. Thus, the sleeve 7 and ring 10 are each provided with a clutch portion, and by sliding the ring longitudinally along the sleeve, these clutch portions can be brought to and out of engagement, the teeth on the end or edge of the ring 10 moving between and withdrawing from the lugs or teeth 14. The gear teeth 11 remain in mesh with the gear 12 when the ring 10 is moved away from the lugs or teeth 14 as seen in Fig. 1, and when the teeth are moved into engagement then the gear teeth 11 will be in full mesh with the gear 12. It is evident that the ring 10 rotates continuously when the gear 12 is in operation, and by moving the ring 10 into engagement with the lugs or teeth 14, this will drive the sleeve 12 and member 1 to transmit the power through the differential gearing. To free or release the engine, the ring 10 is withdrawn from the lugs or teeth of the sleeve 7, thus disconnecting the driving and driven members, and permitting the ring 10 to rotate loosely or freely on the sleeve 7 without turning it.

The ring 10 can be shifted in any suitable manner, such as by providing it with an annular groove 16, preferably at that side opposite to the teeth 13, with an arcuate shoe or fork 16 fitting in the groove 16, and operated by a suitable lever 17, with means (not shown) for control from the operator's seat.

The device is very simple, consisting of but two parts, the sleeve 7 and ring 10 thereon, which replace the ordinary external gear of the differential mechanism, but the present device is nevertheless very suitable for the purpose, as well as being simple and practical.

Having thus described the invention, what is claimed as new is:—

1. The combination with a differential gearing, of a sleeve surrounding the same and connected to one part thereof for driving the gearing, and a driving ring slidable and rotatable on said sleeve, said sleeve and ring having interengageable clutch portions.

2. The combination with a differential gearing, of a sleeve surroundng the same and secured to one part thereof to drive said gearing, and a ring slidable and rotatable on said sleeve, said sleeve having outstanding lugs, and one edge of the ring being notched to engage said lugs.

3. The combination with a differential gearing, of a sleeve surrounding the same and secured to one part thereof to drive said gearing, a ring slidable and rotatable on said sleeve and having gear teeth to mesh with a driving gear, said sleeve and ring having interengageable clutch portions, and means for shifting said ring on said sleeve.

4. The combination with a differential gearing having a rotatable member, a sleeve surrounding said gearing and having one end fitting on and secured to said member, a driving ring slidable and rotatable on said sleeve, said sleeve having outstanding lugs at said end thereof, and the adjacent edge of said rings having notches to engage said lugs.

5. The combination with a differential gearing including a rotatable member having an annular flange and planetary gears therein, of a sleeve fitted on said flange and secured to said member, and a driving ring slidable and rotatable on said sleeve, said sleeve and ring having interengageable clutch portions.

6. The combination with a differential gearing including a rotatable member having an annular flange and planetary gears therein, of a sleeve fitting on said flange and having one end abutting said member, means securing said end of the sleeve to said member, said sleeve having outstanding lugs adjacent to said end, a driving ring slidable and rotatable on said sleeve and provided with outstanding gear teeth to mesh with a driving gear, one edge of said ring being notched to engage said lugs, and means for shifting said ring on said sleeve into and out of engagement with said lugs.

In testimony whereof I have signed my name to this specification in the presence of two subscribing witnesses.

HARTLEY O. BAKER.

Witnesses:
PAULINE S. BROWN,
FRONIE ABELL.